June 19, 1928.
L. F. MONTGOMERY
FABRICATED SHOE SOLE
Filed Nov. 5, 1926
1,674,560
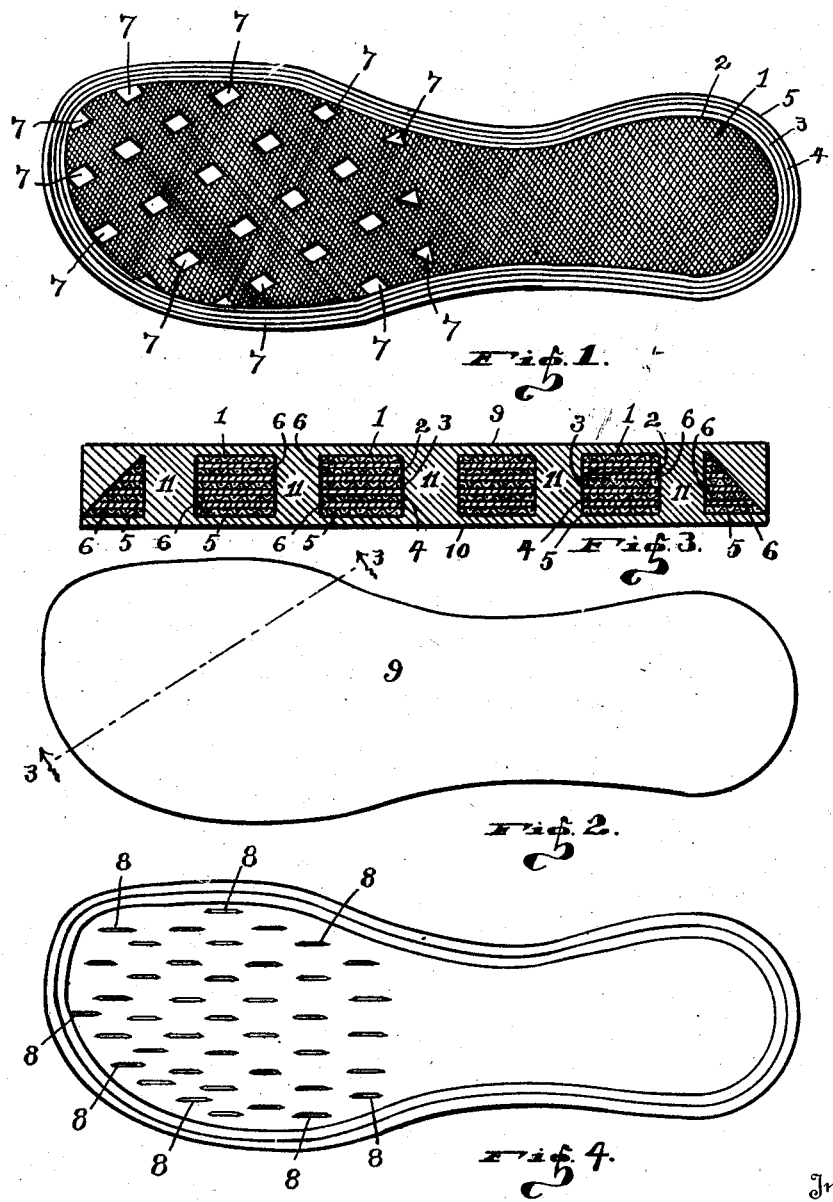
Inventor:
Leon F. Montgomery;
By Robert W. Caudle,
Attorney.

Patented June 19, 1928.

1,674,560

UNITED STATES PATENT OFFICE.

LEON F. MONTGOMERY, OF PORTLAND, INDIANA, ASSIGNOR OF ONE-HALF TO HORACE C. MAYERS, OF CLEVELAND, OHIO.

FABRICATED SHOE SOLE.

Application filed November 5, 1926. Serial No. 146,316.

The object of my present invention, broadly speaking, is to provide a fabricated shoe-sole of simple and durable construction, which will be neat and artistic in appearance, which will be easy and comfortable on the feet of the wearer, and which can be manufactured and sold at a comparatively low price.

More specifically stated, my object is to provide a shoe-sole composed of rubber and fabric, thereby lessening the cost of manufacture by reducing the amount of rubber therein, and at the same time making the sole of greater durability and more comfortable to one's feet when in use.

Still more specifically stated, my object is to provide a shoe-sole formed of alternate layers of rubber and fabric securely vulcanized together, with which is incorporated means for making the strands of fabric of comparatively short length whereby the cords of fabric will not frazzle or run, and thereby producing a sole in which the fabric will have a greater length of life, and also providing means whereby the two outer and the intermediate layers of rubber will be integrally united with each other at frequent points throughout the extent of the sole. And, finally, my object is not alone to produce a shoe-sole constructed substantially as herein set forth, but to produce the same by a new and novel process, which will be fully explained herein.

Other minor objects and particular advantages of my invention will suggest themselves in the course of the following description and that which is new will be correlated in the appended claim.

The specific means for carrying out the objects of this invention in a practical manner is shown in the accompanying drawings, in which—

Figure 1 is an inner-face plan view of the core or fabricated body of my shoe-sole, showing it prior to the application of the outer faces thereof. Figure 2 is a plan view of my finished shoe-sole, as it would appear on either its upper or lower sides. Figure 3 is a cross section of the completed shoe-sole, as taken on the line 3—3 of Fig. 2 and on an enlarged scale. And Figure 4 is a plan view, the same as Fig. 1, except that the apertures formed therethrough are different from that shown in Fig. 1.

Similar indices denote like parts throughout the several views.

In order that the construction, the process of construction, and the several advantages of my invention may be more fully understood and appreciated, I will now take up a detailed description thereof, in which I will set forth the same as fully as I can.

Referring now to my invention in detail: The body of my shoe-sole comprises a plurality of layers of fabric, as for instance the layers 1, 2, 3, 4 and 5, which are superimposed with relation to each other, with a comparatively thin layer of rubber 6, or its equivalent, disposed between each two layers of fabric.

The outer upper edges formed by the combined layers of fabric and rubber are chamfered entirely around the periphery of the body by removing the upper areas, whereby the respective layers are progressively smaller, from the lower to the upper layer, substantially as indicated in Figs. 1 and 4.

The layers of fabric and rubber, arranged as shown in Figs. 1 and 3 are attached tightly together, either by cement or by vulcanization, or otherwise, whereby they are all practically integral with each other.

A plurality of apertures 7, as in Figs. 1 and 3, or slots 8, as in Fig. 4, are then cut through the body thus formed, which are for the two main purposes hereinafter set forth.

Said apertures 7, or 8, are preferably formed only in the forward half of the sole, that is to say no apertures are formed through the heel or the shank portion of the sole, although they may also be provided with corresponding apertures if desired.

After the body portion has been provided with apertures, as above set forth, then the entire body is to be covered with a layer of rubber, or the like, with the same filling all of said apertures 7, or 8, thereby integrally uniting the top layer 9 with the bottom layer 10 by the plugs 11. Also the rubber will cover the edges of all of the layers of fabric, as well as filling in the chamfered edge, thereby covering the entire periphery of the body and bringing the periphery thereof out square, that is at substantially right-angles to the layers 9 and 10, as well as to the fabric, as indicated in Figs. 2 and 3, or it may remain beveled, as in Fig. 1.

The purpose of the apertures 7, and 8, is two-fold: The main purpose is to cut the cords of the fabric whereby they will each be of comparatively short length. This results in longer wear for the sole and affords greater elasticity thereto, and it also prevents the fabric from breaking and frazzling by usage. The second purpose of said apertures is to provide means whereby the layers 9 and 10 of the rubber will be integrally united at frequent intervals throughout the forward portion of the sole, thereby preventing the layers of rubber from becoming detached from the body of the sole by prolonged usage thereof.

After the outside rubber, including the layers 9 and 10, has been applied then the whole should be vulcanized, thereby forming the sole substantially as shown in Fig. 2, with the fabric parts completely enclosed by the rubber parts.

As shown in Fig. 2 the sole when completed has the appearance of a solid-rubber sole, however in fact it will be cheaper in construction, but more especially it will be more durable, more comfortable to wear, and will otherwise carry out the objects above enumerated.

The process of forming my shoe sole consists in providing a plurality of layers of fabric or cords, with each layer formed of a contour such as to simulate the bottom of a human foot, with said layers corresponding with each other in contour, superimposed upon each other, and decreasing in size from the bottom to the top layer, each consisting of a heel portion, a shank portion, and a forward portion, commonly called the "half-sole". The process further consists in placing thin layers of rubber between each two layers of fabric, and then cementing or vulcanizing the rubber and fabric together, thereby forming the body of the sole. The next operation is to form a plurality of apertures or slots through the forward portion, or half-sole, the same being so located as to separate the threads or cords of the fabric into comparatively short lengths.

I next cover the body so formed with rubber, both above and below, filling said apertures or slots with the rubber, covering the edges of the fabric and filling in the bevel formed around the periphery of the body and providing a square vertical or beveled edge on the completed sole. And finally the rubber last applied is vulcanized into connection with the body whereby I provide a practically integral and unitary structure, forming a complete sole, appearing substantially as shown in Fig. 2.

In some instances it may be desirable to build my shoe-sole with but one layer of fabric, thereby omitting the layers of rubber 6, but otherwise forming the sole as above set forth.

I also would have it understood that I am not to be limited to the use of rubber in the construction set forth, an artificial rubber, or a composition, or other equivalent, may be employed.

I desire that it be understood that various changes may be made in the several details herein set forth without departing from the spirit of my invention and without sacrificing any of the advantages thereof which are new and useful.

Having now fully shown and described my invention, what I claim, and desire to secure by Letters Patent of the United States is,—

A shoe sole comprising a laminated body formed with heel and sole portions and made up of alternate superposed layers of different materials, said materials being formed to provide a relatively integral mass, the sole portion of said body being formed with openings extending completely through the layers and the edges of the body being chamfered, and an inherently resilient material molded about the body to form square edges thereon, to completely envelope the body, and to extend through the openings therein to provide a substantially homogeneous mass.

LEON F. MONTGOMERY.